3,176,038
REACTION OF A MONO-UNSATURATED MONO-CARBOXYLIC ACID ESTER, CO, AN ALKANOL AND AN $Rh_2O_3$ CATALYST TO PRODUCE AN UNSATURATED DICARBOXYLIC ACID DIESTER

James Bryan Zachry, Baton Rouge, La., and Clyde Lee Aldridge, Bryan, Tex., assignors to Esso Research and Engineering Company, a corporation of Delaware
No Drawing. Filed Nov. 6, 1961, Ser. No. 150,185
5 Claims. (Cl. 260—485)

The present invention relates to a process for producing unsaturated dicarbonyl compounds. More particularly, it relates to a process wherein alpha, beta-ethylenically unsaturated carbonyl compounds are reacted with carbon monoxide and a co-reactant containing hydrogen bonded to a noncarbon atom, e.g. an alcohol. Still more particularly, it relates to the carbonylation of alpha, beta-ethylenically unsaturated carbonyl compounds, e.g. unsaturated esters, with carbon monoxide and a co-reactant such as an alcohol in the presence of a catalyst comprising rhodium.

The carbonylation of olefins in the presence of alcohols to produce esters is known. It is reported that this conversion can be accomplished either in the presence of acidic catalysts such as phosphoric acid, boron fluoride, or metal halides (see, for example, U.S. 1,979,717) or in the presence of cobalt carbonyls (U.S. 2,542,767). In each instance, an addition reaction occurs at the point of ethylenic unsaturation in the olefin to produce a saturated ester as may be illustrated by the following equation:

(1)
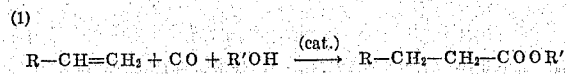

Conjugated diolefins are also known to undergo the addition of carbon monoxide and alcohol at a point of ethylenic unsaturation to produce esters. For example, in our copending application Serial No. 150,184, filed this day, it is disclosed that in the presence of catalysts comprising rhodium, conjugated diolefins react with carbon monoxide and an alcohol at relatively mild conditions of temperature and pressure to give unsaturated monoesters. The addition of carbon monoxide and alcohol to a typical diolefin, butadiene, may be illustrated by the equation:

(2)
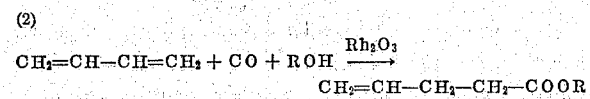

In view of these previous experiences in carbonylating ethylenically unsaturated hydrocarbons, it was to be expected that by carrying out similar reactions with monoethylenically unsaturated nonhydrocarbons, addition to the olefinic bond would also occur to produce saturated carbonylation products. It has now been found, however, that when alpha,beta-ethylenically unsaturated carbonyl compounds are carbonylated with carbon monoxide and an alcohol in the presence of a catalyst comprising rhodium, unsaturated dicarbonyl compounds, e.g., unsaturated diesters, are surprisingly produced. While the exact way in which these entirely unexpected products are formed is not understood, nevertheless, it appears that carbon monoxide and alcohol substitute, rather than add, at the olefinic bond. This may be illustrated with a typical alpha,beta-ethylenically unsaturated carbonyl compound, methyl acrylate, by the following equation:

(3)
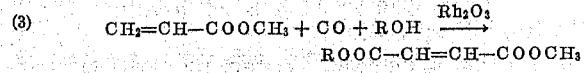

By employing other alpha,beta-unsaturated esters, or alpha,beta-unsaturated acids, aldehydes or ketones, a wide variety of unsaturated dicarbonyl compounds can be produced in a similar way.

The unsaturated reactants which are suitable in the present process comprise $C_3$ to $C_{25}$ alpha-beta-ethylenically unsaturated carbonyl compounds, i.e. compounds in which a carbon-carbon double bond is in conjugated relationship to a carbon-oxygen double bond. That is to say, the unsaturated reactants described herein as alpha,beta-ethylenically unsaturated carbonyl compounds are those compounds having the general structural formula:

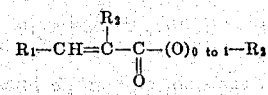

wherein $R_1$, $R_2$ and $R_3$ may be the same or different and are selected from the group consisting of hydrogen and hydrocarbon radicals such as alkyl, cycloalkyl, aryl, alkaryl and aralkyl radicals. When $R_1$, $R_2$ or $R_3$ are hydrocarbon radicals, they will generally be unsubstituted hydrocarbon radicals; however, the presence of unreactive substituents thereon, such as halogen atoms, alkoxy radicals, amino radicals and the like, is also contemplated. Among the suitable unsaturated carbonyl reactants which may be specifically mentioned are aldehydes such as acrolein and substituted acroleins, e.g. alpha-methylacrolein, crotonaldehyde and the like, wherein the alpha and/or a beta carbon atom is substituted by hydrocarbon radicals such as recited hereinabove; ketones such as methyl vinyl ketone, mesityl oxide, phenyl vinyl ketone, ethyl propenyl ketone and the like; and acids such as acrylic acid, alpha-methylacrylic acid, crotonic acid, alpha-phenyl acrylic acid and the like; and esters thereof. The esters of acids such as the above-mentioned unsaturated acids and the $C_1$ to $C_{20}$ alcohols form a preferred class of carbonyl reactants, specifically, the methyl, ethyl, isopropyl, lauryl, cyclohexyl, benzyl, and octadecyl esters. The esters of acrylic acid and methacrylic acid with $C_1$ to $C_7$ aliphatic alcohols are especially preferred as the unsaturated carbonyl reactants in the present process.

In order to obtain unsaturated ester-carbonyl products by the present process, it is necessary that the carbonylation of the alpha,beta-ethylenically unsaturated carbonyl compound be carried out in the presence of an alcohol. The nature of the alcohol is not critical, either primary, secondary, or tertiary alcohols being suitable. Practical considerations, such as ready availability, make alkanols having from 1 to 20 carbon atoms, e.g. methanol, ethanol, pentanol, isopropanol, pentanols, hexanols, cyclohexanol, benzyl alcohol, heptanols, lauryl alcohol, octadecyl alcohol, and the like especially suitable. The most preferred of these are the lower alkanols, e.g. $C_1$ to $C_7$ alkanols. Other hydroxyl-containing compounds such as ethylene glycol, propylene glycol, glycol monoesters, polyalkylene glycol ethers, monoethanolamine, methoxy ethanol, methoxypropanol, triethanolamine, and the like, however, may also be used.

Theoretically, the alcohol and unsaturated carbonyl compound need be present in equivalent amounts. That is to say, to satisfy the stoichiometry of the reaction, at least one hydroxyl hydrogen must be available per mole of unsaturated carbonyl compound. It is preferable, however, that the alcohol be present in amounts stoichiometrically exceeding the amount of carbonyl reactant. While the excess over stoichiometric is not critical, it has been found that by having the alcohol present in quantities sufficient to serve both as a reactant and as a diluent, e.g., preferably greater than 2 moles/mole of unsaturated carbonyl compound, the desired reaction proceeds more smoothly and less difficulties are experienced from side reactions such as polymerization. Alternatively, at least part of the diluent function of the alcohol may be served by using other solvents which are inert under the process conditions, e.g. inert oxygenated solvents, hydrocarbons, and the like.

While not absolutely essential to the process, it has been found that trace amounts of certain substances serve as promoters, i.e. have a pronounced effect in promoting the desired reaction. Generally, the promoters comprise organic carboxylic acids and organic nitrogen bases or combinations thereof. More particularly, the promoters comprise compounds selected from the group consisting of the lower ($C_1$ to $C_7$) carboxylic acids, the lower alkyl amines, aromatic amines, and heterocyclic nitrogen bases, e.g. acetic acid, n-butylamine, aniline and pyridine. In those process systems in which water is not present inadvertently or otherwise, the addition of water thereto is also effective in promoting the desired reaction. The amount of promoter to be added is somewhat dependent upon the type compound employed as promoter as well as upon the nature of the other components of the reaction system; however, routine experimentation will readily establish the optimum amount of promoter in each case. In general, an amount of promoter approximately equivalent to the quantity of catalyst employed is suitable. Amounts exceeding this quantity may be used, but little additional advantage results therefrom.

As noted hereinabove, the catalyst utilized in the present process comprises rhodium. Various forms of rhodium are suitable. For example, either the metal per se or inorganic compounds thereof such as the oxide, halides, nitrate, sulfate and the like are satisfactory. Organic compounds of rhodium may also be used, e.g. rhodium carbonyl, rhodium salts of $C_1$ to $C_{20}$ carboxylic acids such as acetic, propionic, butanoic, hexanoic, maleic, linoleic, and stearic acids, or the salts of $C_1$ to $C_{20}$ alcohols. Of all these, however, rhodium oxide, e.g. the sesquioxide or the dioxide, is the preferred catalyst. Also, rhodium or its compounds may be employed in combination with any of the conventional catalyst carriers such as activated carbon, silica, alumina, silica-alumina, kieselguhr and the like. In such supported catalysts, the proportion of catalyst to carrier is not critical. However, for practical considerations, the rhodium content will comprise from about 1 to 40 wt. percent, based on carrier, with about 3 to 10 wt. percent being preferred.

The amount of catalyst employed in the present process broadly comprises those amounts which effectively catalyze the desired carbonylation reaction. Generally, from 0.001 to 5 wt. percent of the catalyst, calculated as metal based on carbonyl compound, has been found to be suitable, with amounts varying from 0.01 to 1 wt. percent being preferred.

In order to bring about the desired carbonylation reaction, it is necessary to provide superatmospheric pressures of carbon monoxide. Preferably, the carbon monoxide should be substantially free of hydrogen so as to avoid losses either of the unsaturated carbonyl reactant or the unsaturated product through hydrogenation and/or other side reactions. For example, the use of synthesis gas, e.g. 1/1 molar ratio of hydrogen to carbon monoxide as a source of carbon monoxide in the present process results in a variety of both saturated and unsaturated products, e.g. acetals, and consequently, is not to be preferred. However, carbon monoxide streams containing small amounts of hydrogen can be used and advantageously so in those instances in which the cost of removing hydrogen from the carbon monoxide exceeds economic losses due to hydrogenation and/or other side reactions. It is also desirable in order to obtain maximum catalyst efficiency to use a carbon monoxide stream from which catalyst poisons have been removed, e.g. iron carbonyl. The removal of such poisons is readily accomplished by passing the stream under pressure through a bed of solid adsorbent, e.g. molecular sieves, prior to use in the present process.

Stoichiometrically, one mole of carbon monoxide is required for each mole of unsaturated carbonyl reactant. In practice, excesses of carbon monoxide over the theoretical amount are provided. As to the carbon monoxide partial pressure, this is not critical so long as superatmospheric pressures are used. Carbon monoxide pressures of between 250 to 5000 p.s.i.g. have been found to be satisfactory. While lower pressures may be employed, the rate of reaction is adversely affected if the pressure is appreciably reduced. Higher pressures may also be utilized, but any advantage thus realized does not appear to be sufficient to offset the increased costs of ultra-high pressure equipment. The range of carbon monoxide partial pressure between 500 and 3000 p.s.i.g. has been found to be a preferred range from the viewpoint of adequate reaction rates as well as reasonable equipment costs.

The temperature of the reaction may also vary considerably, e.g. from 50° to 300° C. The reaction rate is observed to decrease significantly when lower temperatures are employed, while higher temperatures promote side reactions such as the polymerization of the unsaturated carbonyl reactant and/or the reaction products. Temperatures between 125° and 225° C. are preferred, since in this range of temperatures, the rate of reaction is rapid and losses to side reactions are minimized.

The process of the present invention is generally carried out by heating the reaction mixture comprising the alpha, beta-ethylenically unsaturated carbonyl compound, the alcohol, carbon monoxide, and when employed, the promoter, in a suitable pressure vessel and in contact with the rhodium-comprising catalyst. While the pressure vessel may be constructed of any suitable material, it is preferred to use vessels in which the surfaces exposed to the reactants are inert, e.g. silver. Autoclaves constructed of iron-containing materials can be used, but are not to be preferred, since iron carbonyl, which may form under the reaction conditions, appears to be a catalyst poison. It has also been found that an improvement in the conversion of the unsaturated carbonyl reactant is obtained if the carbonyl compound is introduced into the reaction vessel over a period of time rather than all at once. The process may be carried out in a continuous manner as well as in batch operation as may be desired.

The following examples will serve to further illustrate the process of the present invention.

*Example 1*

400 ml. of methanol and 0.3 g. of rhodium oxide ($Rh_2O_3$) were charged into a 1 liter stirred autoclave. The autoclave was then heated to 150° C. and pressurized to 1250 p.s.i.g. with carbon monoxide. Methyl acrylate (50.5 g.) was thereafter pumped into the heated autoclave over a 1 hour period. The reaction mixture was maintained at the above temperature and pressure for an additional 2 hour period. Unconverted methanol and methyl acrylate were distilled from the reaction product, and the distillate residue was then crystallized from hexane. An 18% conversion of the methyl acrylate was realized with 49% selectivity to dimethyl fumarate, which product was identified by I.R. spectrum and melting point of 102.5–104° C. (lit. 102° C.)

Example 2

The process of Example 1 is repeated using the following carbonyl compounds and alcohols to produce the unsaturated dicarbonyl compounds indicated below:

| Reactants | | Product |
|---|---|---|
| Carbonyl | Alcohol | |
| Methyl vinyl ketone | Methanol | Methyl-4-Oxo-2-pentenoate. |
| α-Methyl acrylic acid | Ethanol | Ethyl-3-carboxy-2-butenoate. |
| Crotonaldehyde | Heptanol | Heptyl-2-methyl-3-formyl-2-propenoate. |
| Methyl cinnamate | Methanol | Dimethyl α-phenyl fumarate. |

It will be appreciated by those skilled in the art that the process of the present invention provides a new route to a variety of useful products. For example, the unsaturated diesters provided when alpha, beta-unsaturated esters are employed as the carbonyl reactant are vinylic compounds useful per se as monomers in homopolymerization and copolymerization reactions whereby useful polymers are produced. The half-esters obtained when alpha,beta-unsaturated acids are the reactant can be used similarly. The unsaturated ester-aldehydes and unsaturated ester-ketones provided when the carbonyl reactant of the present invention is an unsaturated aldeyhde or ketone can be reduced by means known in the art to the corresponding unsaturated hydroxy esters, e.g. methyl 4-hydroxy-2-butenoate, which compounds are useful for introducing ethylenic unsaturation into ester condensation polymers.

It will be understood further that the invention is subject to many modifications. For example, although the process has been illustrated by describing in detail reactions in which the alpha,beta-unsaturated carbonyl compounds are carbonylated in the presence of alcohols, the process is not limited thereto. The alcohol of the present invention may be replaced by other compounds provided such compounds contain at least one hydrogen atom bonded to a noncarbon atom, e.g. an oxygen, nitrogen, or sulfur atom. In general, it may be said that the co-reactants to be suitable in the present process are compounds composed only of the noncarbon atom and hydrogen, or are compounds in which the noncarbon atom is bonded only to carbon in addition to being bonded to at least one hydrogen atom. In addition to alcohols, those compounds fulfilling these requirements of the co-reactant include water, hydrogen sulfide, ammonia, mercaptans, primary and secondary amines, carboxylic acids, thiocarboxylic acids, amides and phenols. The nature of the unsaturated dicarbonyl product will, of course, be dependent upon which of these type co-reactant compounds is used, as well as on the carbonyl reactant. The products may be characterized by the general formula:

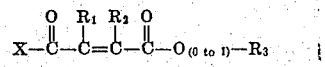

wherein X is a radical such as HO—, HS—, $H_2N$—, RO—, RS—, RNH—, $R_2N$—, RCOO—, RCOS—, RCONH—, RCON(R)—, and the like, R being a $C_1$ to $C_{20}$ alkyl, cycloalkyl, aryl, alkaryl or aralkyl radical, and $R_1$, $R_2$ and $R_3$ being hydrogen or an alkyl, cycloalkyl, aryl, alkaryl or aralkyl radical. Of course, co-reactants containing more than one of the same or different functional groups in which hydrogen is bonded to an oxygen, nitrogen or sulfur atom can be employed; however, of the many co-reactants which are suitable, the alcohols are the preferred class.

What is claimed is:

1. A process for producing an ethylenically unsaturated diester which comprises contacting a reaction mixture containing an unsubstituted $C_4$ to $C_{25}$ alpha,beta mono-ethylenically unsaturated aliphatic carboxylic acid monoester and a $C_1$ to $C_{20}$ alkanol, at least 2 moles of said alkanol being present in said reaction mixture per mole of said unsaturated ester, with substantially hydrogen-free carbon monoxide in the presence of 0.001 to 5 wt. percent, calculated as metal on said unsaturated ester, of a rhodium oxide catalyst at a temperature between 125 and 225° C. and a carbon monoxide partial pressure in the range of 500-3000 p.s.i.g. for a time sufficient to produce said ethylenically unsaturated diester and then recovering said diester.

2. A process according to claim 1 wherein said reaction is carried out in the additional presence of a small but effective amount of a promoter selected from the group consisting of water, n-butylamine, aniline, pyridine and acetic acid.

3. A process according to claim 1 wherein said unsubstituted alpha,beta ethylenically unsaturated ester is a $C_1$–$C_7$ alkanol ester of acrylic acid.

4. A process according to claim 1 wherein said alpha,beta ethylenically unsaturated ester is a $C_1$–$C_7$ alkanol ester of methacrylic acid.

5. A process for producing dimethyl fumarate which comprises contacting a reaction mixture containing methyl acrylate with methanol, at least 2 moles of said methanol being present in said reaction mixture per mole of methyl arcylate, with substantially hydrogen-free carbon monoxide in the presence of 0.001 to 5 wt. percent, calculated as metal on said methyl acrylate, of a rhodium oxide catalyst at a temperature of 125 to 225° C. and a pressure in the range of 500 to 3000 p.s.i.g. for a time sufficient to produce said dimethyl fumarate and then recovering said fumarate.

References Cited by the Examiner
UNITED STATES PATENTS

| 2,448,368 | 11/45 | Gresham et al. | 260—485 |
| 2,871,262 | 1/59 | Benson | 260—485 XR |
| 3,040,090 | 6/62 | Alderson et al. | 260—486 XR |

OTHER REFERENCES

Gilman et al.: Chemical Abstracts, vol. 53, p. 2077d (1959).

LEON ZITVER, *Primary Examiner.*

ABRAHAM H. WINKELSTEIN, A. LOUIS MONACELL, *Examiners.*